United States Patent
Lin

(10) Patent No.: US 9,158,531 B2
(45) Date of Patent: Oct. 13, 2015

(54) SOFTWARE DOWNLOAD METHOD AND SOFTWARE DOWNLOAD APPARATUS

(71) Applicant: Tencent Technology (Shenzhen) Company Limited, Shenzhen (CN)

(72) Inventor: Li Lin, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/260,997

(22) Filed: Apr. 24, 2014

(65) Prior Publication Data

US 2014/0237465 A1    Aug. 21, 2014

Related U.S. Application Data

(63) Continuation of application No. PCT/CN2013/087385, filed on Nov. 19, 2013.

(30) Foreign Application Priority Data

Nov. 26, 2012  (CN) .......................... 2012 1 0486599

(51) Int. Cl.
*G06F 9/44* (2006.01)
*G06F 9/445* (2006.01)
(Continued)

(52) U.S. Cl.
CPC .. *G06F 8/67* (2013.01); *G06F 8/65* (2013.01); *H04L 47/72* (2013.01); *H04L 67/34* (2013.01);
(Continued)

(58) Field of Classification Search
CPC ............... G06F 8/61; G06F 8/65; G06F 8/67; G06F 8/68; G06F 8/71
See application file for complete search history.

(56) References Cited

U.S. PATENT DOCUMENTS

2003/0045356 A1 * 3/2003 Thomas .......................... 463/41
2008/0130639 A1 * 6/2008 Costa-Requena et al. .... 370/389
(Continued)

FOREIGN PATENT DOCUMENTS

CN    102480470 A    5/2012
CN    102724308 A    10/2012

OTHER PUBLICATIONS

Amarakeerthi et al., "Delay Pools-Based Uninterrupted and Dynamic Bandwidth Distribution of Squid Proxy Cache", 2012 ACM, HCCE'12, Mar. 8-13, 2012, pp. 244-246; <http://dl.acm.org/citation.cfm?id=2160801>.*

(Continued)

*Primary Examiner* — Thuy Dao
*Assistant Examiner* — Ben C Wang
(74) *Attorney, Agent, or Firm* — Morgan, Lewis & Bockius LLP

(57) ABSTRACT

A method for updating game software is performed at a first client device. While a game session related to the game software is running at the first client device, the first client device performs steps including: identifying updating data for the game software and predefined criteria for locating one or more other client devices that possess the updating data; locating at least one second client device in accordance with the predefined criteria; sending an outgoing downloading request to the located at least one second client device; and upon acceptance of the outgoing downloading request by the at least one second client device, downloading the updating data from the located at least one second client device. The downloading further comprises dynamically adjusting respective bandwidth allocated to the downloading in accordance with data transmission need of the game session.

20 Claims, 7 Drawing Sheets

(51) Int. Cl.
*H04L 29/08* (2006.01)
*H04L 12/911* (2013.01)

(52) U.S. Cl.
CPC ... *G06F 8/61* (2013.01); *G06F 8/68* (2013.01); *G06F 8/71* (2013.01); *G06F 9/44* (2013.01); *H04L 67/104* (2013.01)

(56) References Cited

U.S. PATENT DOCUMENTS

| | | | |
|---|---|---|---|
| 2008/0209414 A1* | 8/2008 | Stein | 717/173 |
| 2008/0227552 A1* | 9/2008 | Shimomura et al. | 463/42 |
| 2009/0006538 A1* | 1/2009 | Risney et al. | 709/203 |
| 2009/0248872 A1* | 10/2009 | Luzzatti et al. | 709/226 |
| 2010/0011060 A1* | 1/2010 | Hilterbrand et al. | 709/204 |
| 2011/0202656 A1 | 8/2011 | Gentile et al. | |
| 2011/0307884 A1* | 12/2011 | Wabe et al. | 717/178 |
| 2011/0307892 A1* | 12/2011 | Yamazaki et al. | 718/100 |
| 2012/0054282 A1* | 3/2012 | Lin et al. | 709/205 |
| 2012/0170476 A1* | 7/2012 | Chen et al. | 370/252 |
| 2012/0210014 A1* | 8/2012 | El-Beltagy | 709/231 |
| 2012/0252577 A1* | 10/2012 | Webster | 463/31 |
| 2013/0047149 A1* | 2/2013 | Xu et al. | 717/175 |
| 2013/0254274 A1* | 9/2013 | Sun et al. | 709/203 |
| 2014/0007070 A1* | 1/2014 | Huang et al. | 717/170 |
| 2014/0059236 A1* | 2/2014 | Lo et al. | 709/227 |
| 2014/0359606 A1* | 12/2014 | Salameh et al. | 717/178 |
| 2014/0372998 A1* | 12/2014 | Salameh et al. | 717/169 |
| 2015/0142918 A1* | 5/2015 | Wang | 709/219 |

OTHER PUBLICATIONS

Douceur et al., "ThunderDome—Discovering Upload Constraints Using Decentralized Bandwidth Tournaments", 2009 ACM, CoNEXT'09, Dec. 1-4, 2009, pp. 1-12; <http://dl.acm.org/results.cfm?h=1&cfid=699439254&cftoken=51083836>.*

Sharma et al., "Pros and Cons of Model-based Bandwidth Control for Client-assisted Content Delivery", Arxiv, Sep. 25, 2012, pp. 1-9; <http://arxiv.org/pdf/1209.5651.pdf>.*

Hsu et al., "Bulldozer—A Cooperative P2P-based Distribution Platform for User-Centric Content Dissemination", 2011 IEEE, Jun. 5-9, 2011, pp. 1-5; <http://ieeexplore.ieee.org/stamp/stamp.jsp?tp=&arnumber=5962721>.*

Tencent Tech, ISR, PCT/CN2013/087385, Feb. 27, 2014, 3 pgs.

* cited by examiner

SOFTWARE DOWNLOAD METHOD AND SOFTWARE DOWNLOAD APPARATUS

RELATED APPLICATIONS

This application is a continuation application of PCT Patent Application No. PCT/CN2013/087385, entitled "SOFTWARE DOWNLOAD METHOD AND SOFTWARE DOWNLOAD APPARATUS" filed Nov. 19, 2013, which claims priority to Chinese Patent Application No. 201210486599.5, entitled "SOFTWARE DOWNLOAD METHOD AND SOFTWARE DOWNLOAD APPARATUS," filed Nov. 26, 2012, both of which are hereby incorporated by reference in their entirety.

FIELD OF THE INVENTION

The present application relates to the field of communications technologies, and more particularly to a software download method and a software download apparatus.

BACKGROUND OF THE INVENTION

Software upgrade refers to a process of modifying a program or adding new functions and features to a program after software release and releasing the modification or addition in the form of patches, to solve problems caused by design defects, incomplete functions of the program or other reasons during software programming of a software developer. Generally, an update process of these patches or new versions is called a software grade.

Software updates are generally implemented to better satisfy user demands and prevent intrusion of viruses. Software updates include system updates, application updates and so on. An application update involves downloading and installing the latest version of application software. The application software generally alerts a user when newer versions of the software become available and introduce the functions of the new versions to the user. For example, client software updates are one category of application software updates. The performance and interaction of some client software are rather complex and also have customized and diverse characteristics. Therefore, the size of the client software increasingly grows. Taking client software of a massive multiplayer online game as an example, the file size of the client software may reach 1G or even above 10G bytes.

In the implementation of the present application, the inventor finds that: after a new version of software is released each time, users need to download the new version of software from a server, which takes a lot of download time, so that the users need to wait a long time and the normal use of the software is interrupted.

SUMMARY

The above deficiencies and other problems associated with the current practice of device configuration are addressed by the invention disclosed below.

One aspect of the invention involves a method for updating game software is performed at a first client device having one or more processors and memory for storing one or more programs to be executed by the one or more processors, the method comprises: while a game session related to the game software is running at the first client device: receiving an updating notification from a gaming server, the updating notification identifying updating data for the game software and specifying predefined criteria for locating one or more other client devices that possess the identified updating data; locating at least one second client device in accordance with the predefined criteria; sending an outgoing downloading request to the located at least one second client device; and upon acceptance of the outgoing downloading request by the at least one second client device, downloading the updating data from the located at least one second client device, wherein the downloading further comprises: dynamically adjusting respective bandwidth allocated to the downloading in accordance with data transmission need of the game session.

One aspect of the invention involves a first client device. The first client device comprises one or more processors, memory, and one or more program modules stored in the memory and configured for execution by the one or more processors. The one or more program modules include instructions for performing the method described above. Another aspect of the invention involves a non-transitory computer readable storage medium having stored thereon instructions, which, when executed by a mobile device, cause the mobile device to perform the method described above.

Other embodiments and advantages of the invention are apparent in light of the following detailed description.

BRIEF DESCRIPTION OF THE DRAWINGS

To illustrate the technical solutions according to the embodiments of the present application more clearly, the accompanying drawings for describing the embodiments are introduced briefly in the following. The accompanying drawings in the following description are only some embodiments of the present application, and persons of ordinary skill in the art can derive other drawings from the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details.

In order to make the objectives, technical solutions, and advantages of the present application more comprehensible, the present application is described in further detail below with reference to the accompanying drawings. It is obvious that the embodiments to be described are only a part rather than all of the embodiments of the present application. All other embodiments obtained by persons of ordinary skill in the art based on the embodiments of the present application without creative efforts shall fall within the protection scope of the present application.

Figure 1:
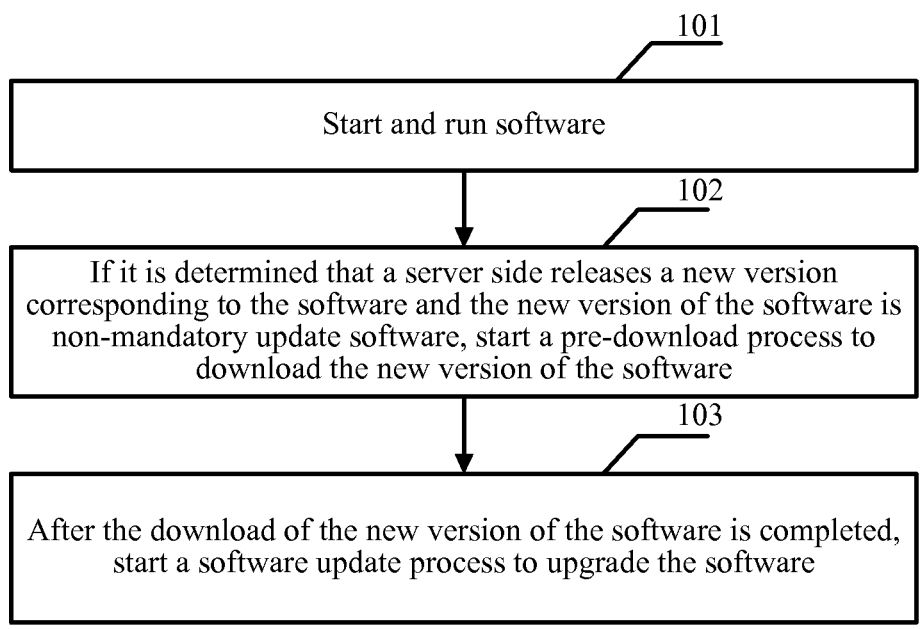
FIG. 1 is a flowchart of a game software downloading method in accordance with some embodiments.

FIG. 1 is a flowchart of a game software downloading method in accordance with some embodiments. The method includes the following steps.

101: Start and run software.

Optionally, the embodiments of the present application further provide a mandatory update solution. Specifically, before entering the normal running of the software, the method further includes: determining whether a server side has released a new version of the software and whether the new version is mandatory update software, if so, starting a software upgrade process to download the new version before entering the normal running of the software, and after downloading of the new version is completed, starting a software update process to upgrade the software and then entering the normal running of the software.

Optionally, the embodiments of the present application further provide a specific implementation of using a grayscale pre-download technology to control the release range of a game. In Step 101, after starting the software at a client terminal, the method further includes: the client terminal reports a local software version and user information to the server side, so that the server determines, according to a software release policy, whether to release information about the new version to the client terminal; and then the client terminal receives from the server feedback indicating whether the server side will release the information about the new version to the client terminal. In some embodiments, the user information optionally includes user account information, user characteristics, and user's geographic location, etc. In some embodiments, an operator can set a software release policy on the server side corresponding to the user information. For example, in order to implement software updates for users within a given geographic area, the server releases the information about the new version to the users' client terminals whose geographic location is within the geographic area.

Step 102: If it is determined that the server side will release the new version to the client terminal and the new version is non-mandatory software update, the client terminal starts a pre-download process to download the new version.

In some embodiments, the non-mandatory software update includes recommended software updates and non-essential software updates. The importance of the recommended software updates (i.e., a type of update that is to be pre-downloaded, and installation of which is recommended) is between that of the mandatory update software (i.e., a type of update that is to be pre-downloaded, and installation of which is mandatory) and that of the non-essential software updates (i.e., a type of update that is pre-downloaded, and installation of which is not performed). The mandatory software update is a type of software update that needs to be forcedly installed, and is generally an important new version for update without which the normal use of the software will be affected. The non-essential software update is a new version that does not need to be installed immediately even if the update data is already downloaded. The non-essential update is generally a non-critical update that does not affect the normal use or the security of the software, or the user experience. Software update of this type does not need to be downloaded or installed immediately. This type of software updates are usually pre-release versions of recommended software updates or pre-release versions of mandatory updates, and may be used to reduce the burden on the server given the simultaneous downloading of the software update at the server. The recommended software update is an important new version that does not affect the normal use of the software, but may affect the security, user experience and the like of the software.

Preferably, some embodiments of the present application further provide an implementation that does not affect current use of the software by the user during downloading of the software update. Specifically, in some embodiments, before downloading of the new version, the method further includes: the client terminal obtains the network environment requirements for normal running of the software; and during downloading of the new version, the client terminal dynamically controls/adjusts bandwidth allocated to the pre-download process, according to the network environment requirements.

Preferably, some embodiments of the present application provide a solution of reducing the burden on the server that provides software resources, where the downloading of the new version includes using a Peer-to-Peer (P2P) protocol to download the new version.

Further, some embodiments of the present application provide two solutions for dealing with the situation where the software is closed during the download. Specifically, the method further includes: exiting the pre-download process when the software is closed or when a user input for closing the software is received; and if the downloading is not completed, after the software is re-started at a later time, re-starting the pre-download process to continue downloading the new version from the previous point. Alternatively, if the downloading is not completed before exiting the pre-download process, the method further includes: notifying the user that the downloading of the new version is not completed and requesting the user's confirmation regarding whether to exit the pre-download process; and if the user confirms to exit the pre-download process, exiting the pre-download process; otherwise, continuing to download the new version.

Preferably, the embodiments of the present application further provide a solution that a user can control the pre-download process at any time during the pre-download process, which specifically includes: during the pre-download process, receiving and executing a download speed control instruction or a pre-download process termination instruction.

Step 103: After the pre-downloading is completed, start the software update process to upgrade the software.

In the foregoing solution, when the software is started on a client terminal, the client terminal determines whether the server side has released a new version of the software that is a non-mandatory software update. The client terminal starts the pre-download process to download the new version if it is determined that the server side has released a new version of the software that is a non-mandatory software update. After the downloading is completed, the client terminal starts a software update process to upgrade the software. The software download process in this solution does not affect the normal use of the software by the user. The software download process in this solution implements the pre-download function, reduces the user wait time, and reduces the interference of software download to the normal use of the software by the user.

Some embodiments of the present application are illustrated in the foregoing three parts, respectively:

1. Start of the Pre-Download Process

In some embodiments, the pre-download process of a software update is set to start when the user starts the software and end when the user closes the software. In other words, the client terminal exits the pre-download process when the software is closed on the client terminal. In this manner, the impact of the pre-download on other processes of the client terminal may be reduced. Meanwhile, in order not to affect the optimal manner that the software is run on the client terminal, optimized pre-download and upload rates may be configured in a configuration file of the software used for the pre-download process, and the user may cancel or suspend the pre-download process at any time during the software running process.

In general, the pre-download process may last for a certain period of time, and the pre-download process may be controlled according to different policies. Some embodiments of the present application provide the following policies: In some embodiments, in accordance with the requirement of a maintenance operation that requires changing the status of the download from a pre-download to a mandatory update, or that configures a mandatory upgrade package based on the pre-downloaded version, the server may change a pre-download instruction to a mandatory update instruction and deliver the mandatory update instruction to the client terminal, thereby implementing the mandatory update. The mandatory update may be implemented in the following two processing manners, for example: 1. for a client terminal that has completed the pre-download or has completed part of the pre-download, the update process is automatically revised to continue the download of resources. In some embodiments, the function of resumable data transfer is supported during the transition from the pre-download process to the mandatory download process; 2. For a client terminal that has not executed a pre-download instruction for the mandatory upgrade package, update resources may be downloaded through a mandatory update channel.

2. Use of a Gray-Scale Pre-Download Technology to Control the Release Range of a Game.

The range for implementing the pre-download may be controlled by using a certain policy. In some embodiments of the present application, a software upgrade control program installed on the client terminal is first connected to the server, and then reports to the server the software version and related client information for the client terminal. The software version and related client information include, for example, client version number, user account information, and user characteristics, etc, such that the implementation range of a pre-download policy in a user group may be configured on the version server. For example, client terminals within a certain region can perform the pre-download first, and the pre-download can be gradually introduced to all the client terminals. Such implementations have at least the following advantages: 1. the probability that too many clients are downloading software update at the same time is reduced, and thereby the burden on the download server is alleviated; and 2. if there is any problem existing in the newly released software update, rollback can be performed in time, and the overall impact on the users may be reduced.

The gray-scale pre-download management greatly improves the success rate of the pre-download technique, and reduces the operation risk of the software providers.

3. Use of a P2P Upload Technology

The pre-download lasts for a certain period on the client terminal. According to this feature, a P2P upload technique may be used to perform P2P upload of a file that has already been downloaded onto the client terminal. The P2P contribution rate grows with the increase in the total number of users. In this manner, the bandwidth burden on the server side and the burden on the server to provide the software resources can be reduced.

By using the above solutions, some embodiments of the present application can improve user experience from the perspective of users, reduce the online wait time of the users for the upgrade, and transfer at least part of the upgrade time to the time of normal use of the software by the users.

From the perspective of the providers, the pre-download technology can be used to reduce the peak demand on bandwidth when the updated version is officially released. Since some users have already downloaded all or a part of the software update by the time that the software update is officially released, and at least some of the downloaded part of the software is contributed as seeds for download using a P2P protocol, the burden on the server that provides the software resources can be reduced. Meanwhile, the pre-download range is gradually expanded according to a certain policy, which is a safer way for releasing a game. Specifically, the scope of the users reached by the software update is gradually expanded if no problem is observed during a certain period of limited release. If an error is discovered during the gradual and limited release, rapid and timely rollback can be conveniently performed, and the overall impact on the users is reduced.

Figure 2:
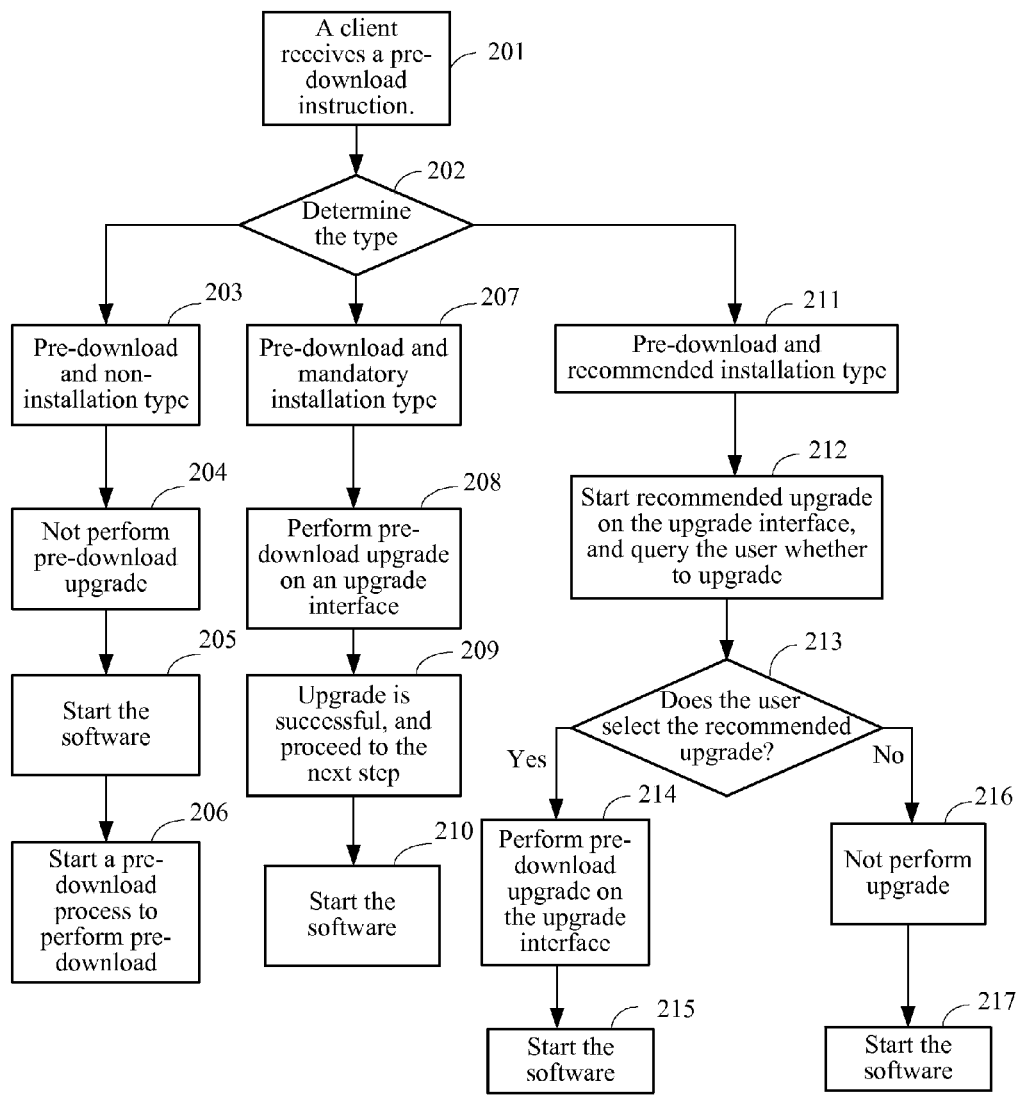
FIG. 2 is a flowchart of a game software downloading method in accordance with some embodiments.

Example embodiments are provided below for illustration. The examples are classified according to the different types of pre-download that has been made available, and in each example, a different process is selectively performed by the client terminal. FIG. 2 is a flowchart of an exemplary game software downloading method in accordance with some embodiments. The method includes the following steps.

201: A client terminal receives a pre-download instruction. This step may be that a client terminal determines that a server side has released a new version of a software application or other updating data that can be used for updating the software application.

202: The client terminal determines the type of the pre-download specified in the pre-download instruction. This step determines the type of the updating data that is to be downloaded (e.g., mandatory software update, recommended software update, non-essential software update, etc.).

203: Proceed to this step from step 202, if the updating data belongs to a "pre-download and non-installation" type (i.e., a non-essential software update).

204: When the updating data belongs to the "pre-download and non-installation" type (i.e., a non-essential software update), the client terminal does not perform the pre-download of the software update, and proceeds to the next step 205.

205: The client terminal starts the software normally, and proceeds with the normal operation of the software application.

206: The client terminal further starts a pre-download process to perform pre-download of the software update. This step implements downloading of the software update without affecting the normal use of the software application. For example, the downloading of the software application can be executed in the background while the user is engaged in normal use (e.g., normal game play) using the software application (e.g., game software).

207: Proceed to this step from step 202, if the updating data belongs to a "pre-download and mandatory installation" type (i.e., a mandatory software update).

208: When the updating data belongs to the "pre-download and mandatory installation" type (i.e., a mandatory software update), the client terminal performs pre-download upgrade on an upgrade interface. Since the normal use of the software application will be affected if the software update is not performed, the updating data needs to be downloaded and installed before the normal running of the software application.

209: When the upgrade (e.g., including the download and installation of the updating data) is successful, the client terminal proceeds to the next step 210.

210: The client terminal starts the upgraded software application. This step starts the normal use of the software application after the mandatory upgrade.

211: Proceed to this step from step 211, if the updating data belongs to a "pre-download and recommended installation" type (i.e., a recommended software update).

212: The client terminal starts the recommended upgrade on the upgrade interface, and queries the user whether to upgrade the software application using the recommended update.

213: The client terminal determines whether the user has selected the recommended upgrade, and if yes, the client terminal proceeds to Step 214; otherwise, the client terminal proceeds to Step 216.

214: The client terminal performs the pre-download upgrade on the upgrade interface (e.g., including download and installation of the recommended software update). Since the user has opted to upgrade in Step 213, the updating data can be downloaded and installed before the normal running of the software application in Step 215.

215: The client terminal starts the upgraded software application. This step starts the normal use of the software after the user has selected to upgrade and after the updating data has been downloaded and installed.

216: The client terminal does not perform the upgrade. In some embodiments, this step includes starting the pre-download process to perform pre-download of the updating data by default.

217: The client terminal starts the normal running of the software application, and the user can start the normal use of the software application.

In the foregoing embodiments, a software download process of this solution implemented in at least Steps 201 to 206 can realize the download of updating data without affecting the normal use of the software application by the user. The solution uses the pre-download function, reduces the user's wait time, and reduces the interference of software download to the normal use of the software by the user.

Figure 3:
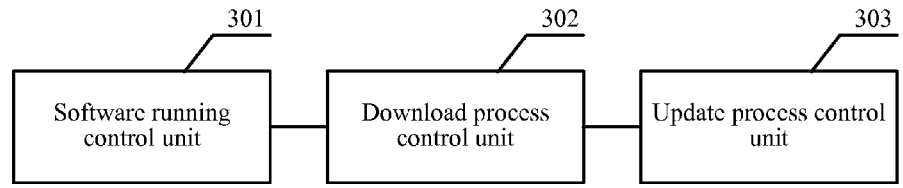
FIG. 3 is a schematic structural diagram of a game software downloading device in accordance with some embodiments.

FIG. 3 is a schematic structural diagram of a game software downloading device (e.g., a client terminal) in accordance with some embodiments. The device includes the following units in accordance with some embodiments.

A software running control unit 301 is used for starting and running software.

A download process control unit 302 is used for starting a pre-download process to download a new version or other updating data for the software, when the client terminal determines that a server side has released the updating data and that the updating data is a non-mandatory software update.

An update process control unit 303 is used for, after the downloading is completed, starting a software update process to upgrade the software.

In the foregoing solution, when the software is started, the client terminal determines that the server side releases updating data for the software and that the updating data is a non-mandatory software update, the client terminal starts the pre-download process to download the updating data. After the downloading is completed, the client terminal starts the software update process to upgrade the software using the updating data. The software download process realizes a pre-download function, and provides a solution that does not affect the normal use of the software by the user, thereby reducing the user's wait time, and the interference of software download to the normal use of the software by the user.

Further, some embodiments of the present application provide a mandatory update solution. The download process control unit 302 is further used for, before running of the software, starting a software upgrade process to download the updating data before running of the software, when the client terminal determines that the server side has released the updating data and that the updating data is a mandatory software update.

In some embodiments, the update process control unit 303 is further used for, after downloading of the updating data of the mandatory software update is completed, starting the software update process to upgrade the software (i.e., installing the updating data).

In some embodiments, the software running control unit 301 is further used for running the upgraded software after the updating data of the mandatory software has been installed to complete the upgrade of the software.

Figure 4:
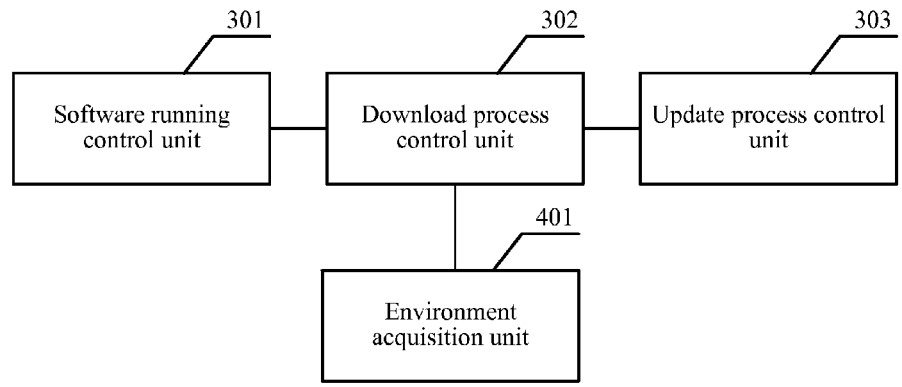
FIG. 4 is a schematic structural diagram of a game software downloading device in accordance with some embodiments.

Further, some embodiments of the present application provide an implementation that does not affect current use of the software by the user during software downloading. As shown in FIG. 4, the software download apparatus further includes the following units.

An environment acquisition unit 401 is used for, before downloading of the updating data, acquiring network environment requirements (e.g., ports, data download and upload bandwidths, number of download/upload channels, etc.) for normal running of the software.

The download process control unit 302 is further used for, during downloading of the updating data, dynamically controlling, according to the network environment requirements, bandwidth allocated to the pre-download process.

Figure 5:
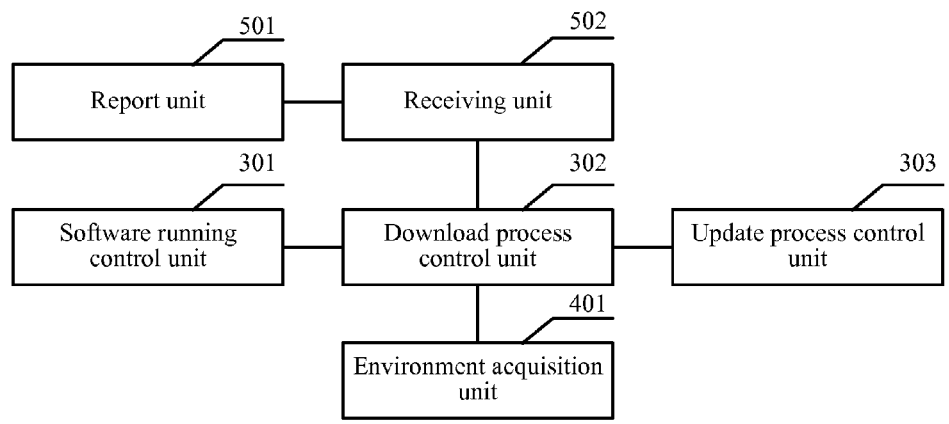
FIG. 5 a schematic structural diagram of a game software downloading device in accordance with some embodiments.

Further, some embodiments of the present application provide a specific implementation of using a gray-scale pre-download technology to control the release range of game software. As shown in FIG. 5, the software download apparatus further includes the following units.

A report unit 501 is used for, after the software running control unit 301 starts the software, reporting a local software version and user information to the server side, so that the server determines, according to a software release policy configured by the server side, whether to release information about the updating data to a client terminal corresponding to the received user information.

A receiving unit 502 is used for receiving from the server feedback indicating whether the server side has released the information about the updating data.

Preferably, some embodiments of the present application provide a solution of reducing the burden on the server that provides the software resources, and the download process control unit 302 is specifically used for using a P2P protocol to download the updating data.

Further, some embodiments of the present application provide two solutions for dealing with the situation that the software is closed during the download. Specifically, in some embodiments, the download process control unit 302 is further used for exiting the pre-download process when the software is closed or when a user input closing the software is received; and if the downloading is not completed, after the software is re-started at a later time, starting the pre-download process to continue downloading the remainder of the updating data. Alternatively, the download process control unit 302 is further used for, if the downloading is not completed before exiting the pre-download process, prompting the user to provide a confirmation regarding whether to exit the pre-download process, and if the user confirms to exit the pre-download process, exiting the pre-download process; otherwise, continuing to download the remainder of the updating data.

Further, some embodiments of the present application provide a solution that a user can control the pre-download process at any time. Specifically, in some embodiments, the download process control unit 302 is further used for, during the pre-download process, receiving and executing a download rate control instruction or a pre-download process termination instruction.

Figure 6:
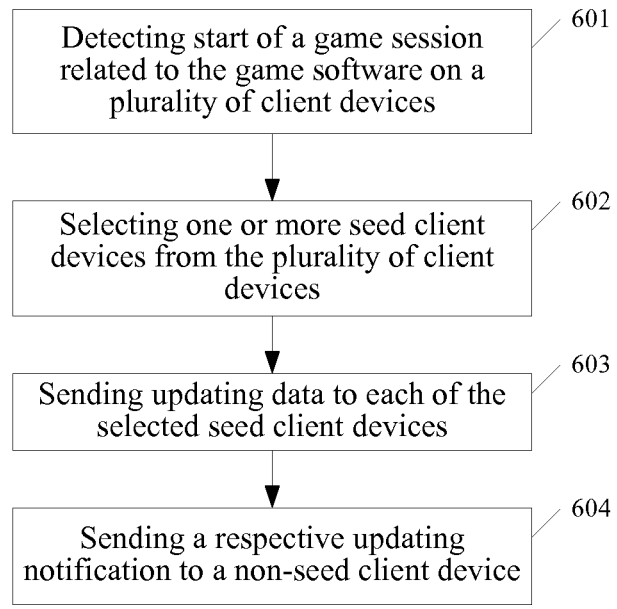
FIG. 6 is a flowchart of a game software downloading method in accordance with some embodiments.

FIG. 6 is a flowchart of a game software downloading method in accordance with some embodiments. The method is performed at a gaming server having one or more processors and memory for storing one or more programs to be executed by the one or more processors. The downloading process described below can be used to implement the pre-download process described above.

In accordance with some embodiments, instead of relying on users to manually download and install the updating data, the server sends updating data to the client devices while the client devices are connected with the gaming server in game sessions. When the gaming server publishes a new version of a game, it sends updating data of the new version to some but not all client devices that are connected with the gaming server.

In step 601, the gaming server detects the start of a game session related to the game software on a plurality of client devices. In some embodiments, the gaming server then acquires the account, location and other information of the client devices. In some embodiments, the gaming server uses the acquired information to further acquire historic activities of the client devices from a database.

In step 602, the gaming server selects one or more seed client devices from the plurality of client devices based on at least one of respective locations and historic activities of the plurality of client devices. The gaming server may send a respective updating notification to each of the seed client device. In some embodiments, the gaming server implements a gray-scale update policy that gradually releases the updating data to all client devices. In some embodiments, the seed client devices are selected according to the gray-scale update policy.

In some embodiments, the seed client devices are configured to receive at least part of the updating data of the new version directly from the gaming server and to send the updating data to other client devices, through a peer-to-peer protocol. In some embodiments, the gaming server uses various criteria to determine which client devices should be the seed client devices. For example, when the game software is distributed worldwide or to many geographic areas, it is advantageous that the selection of seed client devices is based on the distribution of game client devices (e.g., the density of the client devices and activity level of the client devices), the locations of the client devices, and the data transfer performance of the client devices, etc. In some embodiments, the server divides all client devices by a number of regions and ensure that each region have a certain number of seed client devices. The number of seed client devices in each region can vary according to the number of all client devices in that region.

In some embodiments, alternative or complementary to choosing the seed client devices based on locations, the selection of seed client devices can be based on the historic activities of the client devices. Historic activities include the data communication among the client devices during usage of the software application (e.g., during previous game sessions). Many games enable multiple client devices to be connected with each other, directly or through a server, in one game session. The game provider may set up one or more game servers in each region to facilitate the interactions among users. Historical data communication density among client devices suggests how data is transmitted among client devices and provide basis on how to select seed client devices. Mapping historical data communication density among client devices can divide client devices by data neighborhoods in a way that is similar to dividing them by regions. The server can provide each data neighborhood a number of seed client devices.

In some embodiments, the historic activity data can also include the time in a day that each client device typically runs the game and a respective total amount of time that each of the plurality of client devices typically stayed connected with the gaming server in a past period of time. In accordance with some embodiments, the selection of seed client devices facilitates that the time that the seed client devices are available to upload updating data matches the time the non-seed client devices downloading the updating data. In addition, in some embodiments, the selection of seed client devices may takes into account the amount of time that a client device typically stays online because a long period of time of staying online is advantageous for other client devices to download data from the seed client device. In some embodiments, historic activity data include the speed and stability of a client device connecting with a server and/or other client devices.

In step 603, in some embodiments, the gaming server sends updating data to each of the selected seed client devices. In accordance with some embodiments, the respective bandwidth allocated to sending the updating data to each of the selected seed client devices is adjusted according to respective data transmission need of the seed client device in the game session. In some embodiments, the bandwidth is adjusted so as not to disturb the user of a seed client device in playing the game. The seed client devices should be selected in a way so that they are suitable for forwarding the new updating data to other client devices. In some embodiments, the gaming server forces installation of the updating data by sending the updating data as a mandatory software update (e.g., even if the same updating data would be introduced as a recommended software update or a non-essential software update). In some embodiments, the server selects the seed client devices from a group of client devices that have previously opted for serving as seed client devices or installing all releases of software updates. In some embodiments, the server allows a user of the selected seed client device to refuse the responsibility as a seed client device for the current software update.

In step 604, in some embodiments, the gaming server sends a respective updating notification to a non-seed client device. In accordance with some embodiments, the respective updating notification is sent to a non-seed client device when the non-seed client device is connected with the gaming server in a game session. The server acquires the game version, location and historic activity information of the non-seed client device and sends an updating notification that is configured for the non-seed client device. The respective updating notification is configured to start a downloading process on the non-seed client device, e.g., as described in FIG. 7.

Figure 7:
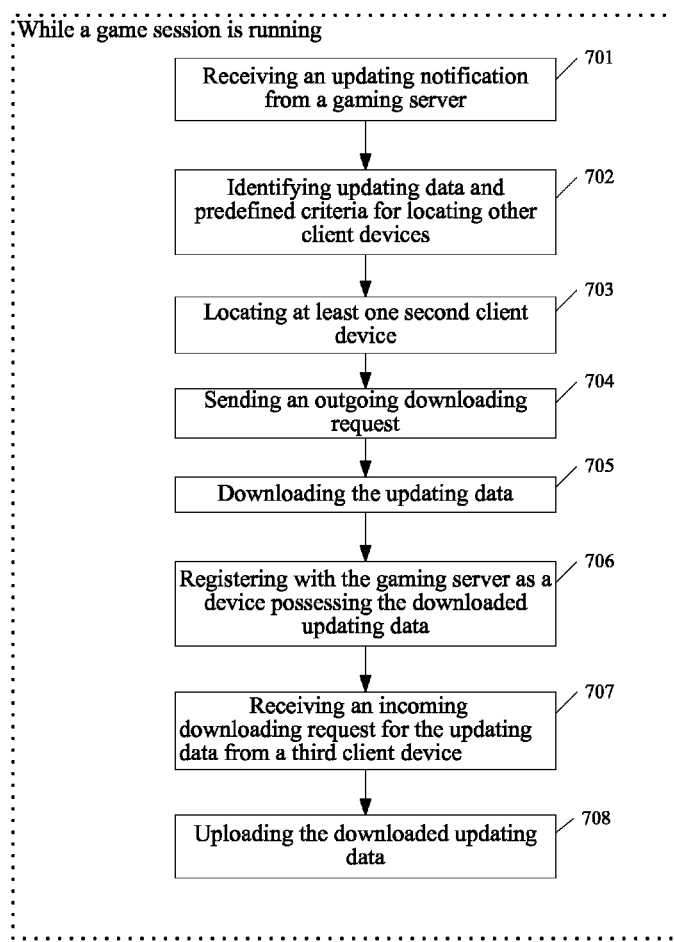
FIG. 7 is a flowchart of a game software downloading method in accordance with some embodiments.

FIG. 7 is a flowchart of a game software downloading method in accordance with some embodiments. The method is performed at a first client device having one or more processors and memory for storing one or more programs to be executed by the one or more processors. FIG. 7 describes a downloading and uploading process that occurs at the first client device in a game session. The first client device can serve as either a seed client device or a non-seed client device depending on whether it has acquired the updating software. The gaming server can be any server that sends out updating data, including a master server that first sends out the updating data and a regional server that receives the updating data from the master server and then distributes the updating data in its region.

In step 701, in some embodiments, the first client device receives an updating notification from a gaming server when a user is playing a game using the game software. In some embodiments, the updating notification is received after the gaming server acquires the game program information from the first client device when the first client device first logs onto the server. In some embodiments, the updating notification received from the server identifies the updating data and specifies predetermined criteria for locating one or more other client devices that possess the identified updating data.

In step 702, in some embodiments, the first client device identifies the updating data for the game software and the predefined criteria for locating the one or more other client devices that possess the identified updating data in accordance with the updating notification. In accordance with some embodiments, identifying updating data utilizes the game version information of the game software. If the first client device has downloaded part of the updating data for the new version in previous game sessions, the first client device needs to further identify the remainder of the updating data that still needs to be downloaded.

In some embodiments, the predefined criteria for locating one or more other client devices include locations and/or network activities of other client devices. For example, in some embodiments, the predefined criteria require that the first client device be in a common geographic region as the at least one second client device. The first client device can only locates client devices that are in the same city and in the network provided by the same access service provider.

In accordance with some embodiments, the predefined criteria can also require certain threshold for the historic activities of other client devices. For example, the first client device may only locate client devices that use the same regional server, have interacted with the first client device in a previous game session, or have interacted with the same third device as the first client device in previous game sessions. Further, in some embodiments, the predefined criteria can require that respective historic traffic densities between the first client device and each of the at least one second client device is above a predetermined threshold.

The first client device may acquire information regarding whether any other client devices possess the identified updating data by more than one way. For example, in some embodiments, every client device optionally notifies the gaming server regarding what updating data the client device has downloaded. The first client device then acquires from the gaming server a list of client devices that possess the needed updating data in the updating notification. The first client device then uses the predefined criteria and its own characteristics (e.g., location, data communication logs, etc.) to determine which client devices in the list meet the predefined criteria. In some embodiments, the first client device can ping and "ask" each of the client devices that meet the predefined criteria whether any of them has downloaded all or part of the identified updating data.

In step 703, in some embodiments, the first client device locates at least one second client device in accordance with the predefined criteria. The second client device can be either a seed client device or a non-seed client device that has acquired at least part of the updating data through a pre-download process.

In step 704, in some embodiments, the first client device sends an outgoing downloading request to the located at least one second client device and/or the gaming server. In some embodiments, the first client device optionally sends out multiple outgoing downloading requests to the second client devices and/or the gaming server. The outgoing downloading requests include descriptions of the requested updating data and, optionally, information related to the first client device itself. In some embodiments, each of the multiple outgoing download requests optionally requests only a selected portion of the updating data, and when the first client device receives all portions of the updating data, the whole updating data can be assembled using the different portions.

In step 705, in some embodiments, upon acceptance of the outgoing downloading request by the at least one second client device and/or the gaming server, the first client device downloads the updating data from the located at least one second client device and/or the gaming server. In some embodiments, the second client device directly sends the updating data to the first client device through a direct network connection without passing through the server. In accordance with some embodiments, the respective bandwidth allocated to the downloading is dynamically adjusted in real-time in accordance with the real-time data transmission need of the current game session. Similarly, in some embodiments, the respective bandwidth allocated to the uploading by the second client device is dynamically adjusted in accordance with the real-time data transmission need of the current game session as well. For example, when the data exchange required for game play increases (e.g., when the game play is very active), the bandwidths allocated to the download and/or upload of the updating data are dynamically reduced. When the data exchange required for game play decreases (e.g., when the game play is not active), the bandwidths allocated to the download and/or upload of the updating data are dynamically increased accordingly.

Importantly, in accordance with some embodiments, the first client device is also configured to download directly from the gaming server simultaneously with downloading from the second client device. Further, in some embodiments, the first client device may download updating data only from the gaming server only if there is no second client device is located. In some embodiments, the first client device optionally downloads from multiple second client devices simultaneously.

In accordance with some embodiments, the updating data is categorized as either normal updating data or sensitive updating data. When a client device downloads any sensitive data, it reports to the gaming server. In some embodiments, the gaming server keeps a list of all client devices that possess sensitive updating data, and notifies these client devices to properly dispose the sensitive updating data when needed. In some embodiments, a flag indicating whether the updating data is sensitive or not is included in the updating data. In some embodiments, the client device deletes the sensitive updating data if so instructed by the gaming server. In some embodiments, the categorization of normal or sensitive updating data can be based on whether the updating data is for trial purpose (e.g., as in a test version of a mandatory update). In some embodiments, the sensitive updating data can be a beta version of a mandatory update and the game provider wants to observe how the updated game is played by some but not all of the users first. The gradual dissemination of the update realized by some embodiments of this invention help the game provider to recall and recycle the new version if any problem arises from the sensitive updating data. In some embodiments, in setting the priority of downloading the updating data, the first client device can set different priority to normal updating data and sensitive updating data to accelerate or slow down the spread of sensitive updating data among client devices. In some embodiments, if the second client device is to upload both sensitive updating data and normal updating data to the first client device, the second client device upload the normal updating data first, such that if the sensitive updating data is to be recalled by the server, there is a higher likelihood that the sensitive updating data has not yet been downloaded by the first client device.

In accordance with some embodiments, the first client device installs at least part of the updating data in the game software while the game session is running. For example, certain resources in the updating data (e.g., skins, items, objects, etc.) may be available for use in the current game session immediately as they get downloaded, and no installation is needed. In some embodiments, some of the updating data can be installed when the game software is restarted before all updating data is downloaded. In some embodiments, the game software can install the updating data after all updating data has been downloaded.

In step 706, in some embodiments, upon downloading at least part of the updating data, the first client device registers with the gaming server as a device possessing the downloaded updating data. In some embodiments, the gaming server maintains a client device database that records the data possession information of all client devices. In some embodiments, to facilitate the registration and recording, the gaming server divides the updating data into small pieces beforehand and provides a unique identifier to each piece of data. When a client device is set to download updating data from other client devices, the client device acquires a list of client devices that possess the individual pieces of the identified updating data, and contacts the appropriate client devices accordingly.

In accordance with some embodiments, client devices acquire data possession information from other client devices directly, without receiving a list of client devices.

In accordance with some embodiments, even if the downloading is not completed before the game session is ended, the downloading is terminated when the game software is closed. In some embodiments, the first client device continues to download the rest of the updating data when the game session is started again. In some embodiments, the first client device repeats the steps of 702-705 in the downloading process during the new game session. After the downloading resumes, identifying updating data for the game software involves identifying the remainder of the updating data that is not downloaded yet.

In step 707, the client device receives an incoming downloading request for the updating data from a third client device. In accordance with some embodiments, when receiving respective incoming downloading requests from multiple requesting client devices, a client device prioritizes acceptance for the multiple incoming downloading requests in accordance with a determination of whether a respective user of each requesting client device is grouped together with a user of the first client device in the game session. In some embodiments, priority of acceptance can be based on any or a combination of characteristics of a client device. Those characteristics include, average or current delay in data transmission from the first client device to a third client device, the historic activities of a third client device (including those described in association with step 602 of FIG. 6), and the updating data requested by a third client device, etc. In accordance with some embodiments, the user can also manually control which downloading requests to accept first.

In step 708, the first client device uploads the downloaded updating data to the third client device. The respective bandwidth allocated to the uploading of the second client device is adjusted in accordance with data transmission need of the game session so as not to interfere with the gaming experience of the user.

In some embodiments, the client device terminates the downloading and uploading upon that the game software is closed. In accordance with some embodiments, a user is able to terminate the downloading and/or uploading by his/her choice before the game software is closed or the downloading/uploading is completed.

Figure 8:
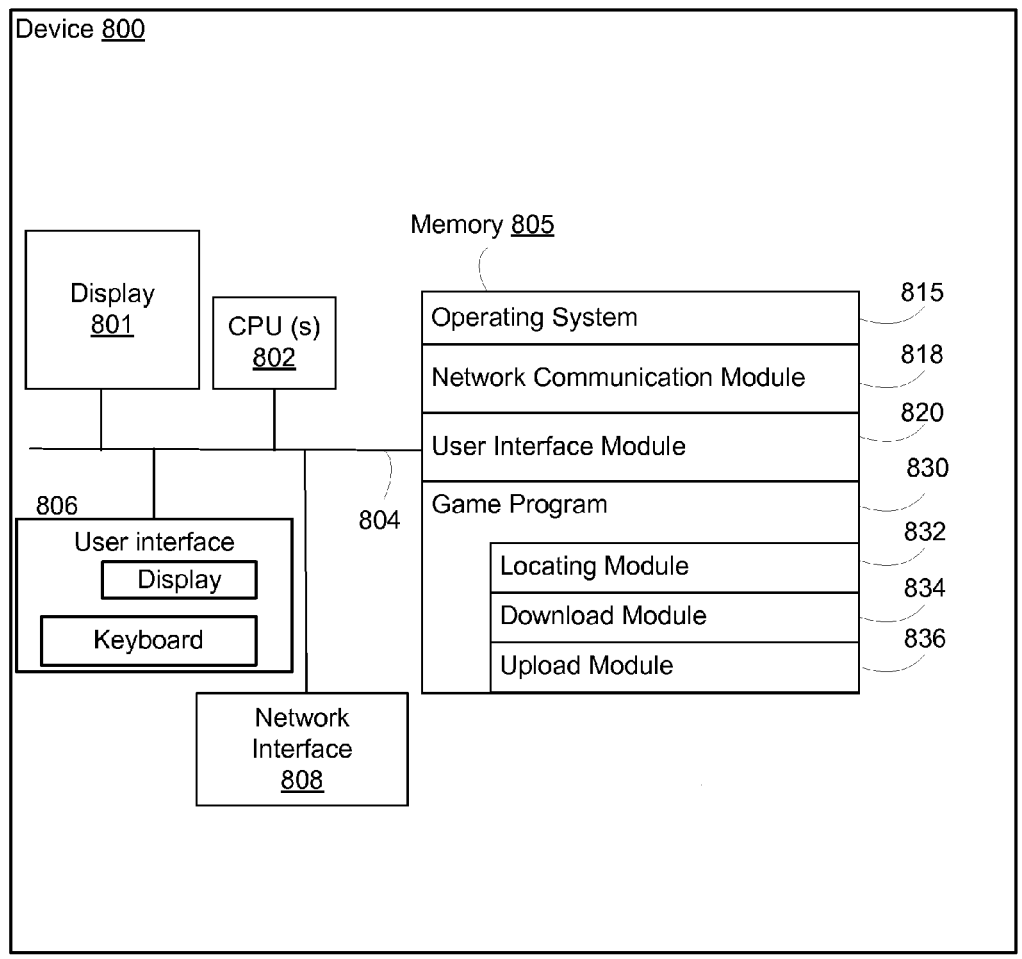
FIG. 8 is a schematic structural diagram of a game software downloading device in accordance with some embodiments.

FIG. 8 is a diagram of an example implementation of a game software client device in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the client device 800 includes one or more processing units (CPU's) 802, one or more network or other communications interfaces 808, a display 801, memory 805, and one or more communication buses 804 for interconnecting these and various other components. The communication buses may include circuitry (sometimes called a chipset) that interconnects and controls communications between system components. The memory 805 includes high-speed random access memory, such as DRAM, SRAM, DDR RAM or other random access solid state memory devices; and may include non-volatile memory, such as one or more magnetic disk storage devices, optical disk storage devices, Flash memory devices, or other non-volatile solid state storage devices. The memory 805 may optionally include one or more storage devices remotely located from the CPU(s) 802. The memory 805, including the non-volatile and volatile memory device(s) within the memory 805, comprises a non-transitory computer readable storage medium.

In some implementations, the memory 805 or the non-transitory computer readable storage medium of the memory 805 stores the following programs, modules and data structures, or a subset thereof including an operating system 815, a network communication module 818, a user interface module 820, and a text-processing program 830.

The operating system 815 includes procedures for handling various basic system services and for performing hardware dependent tasks.

The network communication module 818 facilitates communication with other devices via the one or more communication network interfaces 808 (wired or wireless) and one or more communication networks, such as the internet, other wide area networks, local area networks, metropolitan area networks, and so on.

The user interface module 820 is configured to receive user inputs through the user interface 806.

The game program 830 is configured to execute a game for a user and to upload and download updating data of the game. In addition to gaming components that are configured to run the game, the game program 830 further comprise a locating module 832, a download module 834 and an upload module 836. The locating module 832 is configured to locating other client devices as described in step 703 in FIG. 7. The download module and 834 and the upload module 836 are configured to download and upload updating data, respectively.

Figure 9:
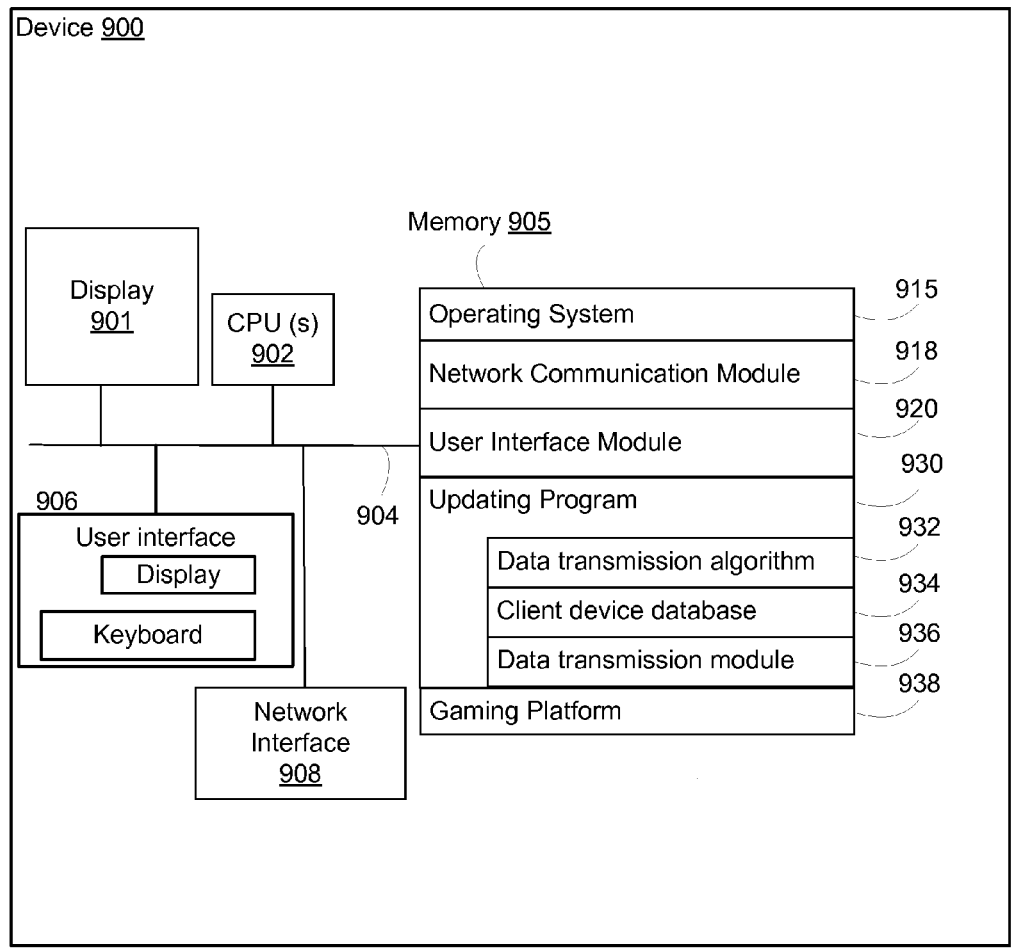
FIG. 9 is a schematic structural diagram of a game server in accordance with some embodiments.

FIG. 9 is a diagram of an example implementation of a gaming server in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the server computer 900 includes one or more processing units (CPU's) 902, one or more network or other communications interfaces 908, a display 901, memory 905, and one or more communication buses 904 for interconnecting these and various other components. The communication buses may include circuitry (sometimes called a chipset) that interconnects and controls communications between system components. The memory 905 includes high-speed random access memory, such as DRAM, SRAM, DDR RAM or other random access solid state memory devices; and may include non-volatile memory, such as one or more magnetic disk storage devices, optical disk storage devices, Flash memory devices, or other non-volatile solid state storage devices. The memory 905 may optionally include one or more storage devices remotely located from the CPU(s) 902. The memory 905, including the non-volatile and volatile memory device(s) within the memory 905, comprises a non-transitory computer readable storage medium.

In some implementations, the memory 905 or the non-transitory computer readable storage medium of the memory 905 stores the following programs, modules and data structures, or a subset thereof including an operating system 915, a network communication module 918, a user interface module 920, and a text-processing program 930.

The operating system 915 includes procedures for handling various basic system services and for performing hardware dependent tasks.

The network communication module 918 facilitates communication with other devices via the one or more communication network interfaces 908 (wired or wireless) and one or more communication networks, such as the internet, other wide area networks, local area networks, metropolitan area networks, and so on.

The user interface module 920 is configured to receive user inputs through the user interface 906.

The updating program 930 is configured to select seed client devices, send updating data and send updating notifications. The updating program 930 comprises a data transmission algorithm 932, a client device database 934 and a data transmission module 936. The data transmission algorithm is configured to select seed client devices according to the client device data stored in the client device database 934. The data transmission module 936 is configured to send updating data and updating notifications to client devices according to the instructions from the data transmission algorithm 932.

The gaming platform 938 is configured to support game sessions for connected client devices. The gaming platform 938 is also configured to acquire location information and other gaming information of client devices and provide the information to the updating program 930.

It should be noted that, in the above embodiment of the software download apparatus, the units are divided according to functional logic, but are not limited to the above division as long as they can implement corresponding functions. In addition, the specific name of each functional unit is used for distinguishing, instead of limiting the protection scope of the present application.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method for updating game software at a first client device having one or more processors and memory for storing one or more programs to be executed by the one or more processors, the method comprising:
    while a game session related to the game software is running at the first client device:
        receiving an updating notification received from a gaming server, the updating notification identifying updating data for the game software and specifying predefined criteria for locating one or more other client devices that possess the identified updating data;
        locating at least one second client device in accordance with the predefined criteria;
        sending an outgoing downloading request to the located at least one second client device;
        upon acceptance of the outgoing downloading request by the at least one second client device, downloading the updating data from the located at least one second client device,
            and dynamically adjusting respective bandwidth allocated to the downloading;
        upon downloading at least part of the updating data, registering with the gaming server as a device possessing the downloaded updating data;
        receiving an incoming downloading request for the downloaded updating data from a third client device; and
        upon receiving the incoming downloading request for the downloaded updating data from the third client device, uploading the downloaded updating data to the third client device.

2. The method of claim 1,
    wherein the uploading further comprises: dynamically adjusting respective bandwidth allocated to the uploading in accordance with the data transmission need of the game session.

3. The method of claim 1, wherein the predefined criteria require that the first client device be in a common geographic region as the at least one second client device.

4. The method of claim 1, wherein the predefined criteria require that respective historic traffic density between the first client device and each of the at least one second client device is above a predetermined threshold.

5. The method of claim 1, wherein the updating data is categorized as either normal updating data or sensitive updating data.

6. The method of claim 5, further comprising:
    reporting to the gaming server upon downloading any sensitive updating data; and deleting the sensitive updating data upon instruction by the gaming server.

7. The method of claim 1, further comprising:
utilizing at least part of the updating data in the game software while the game session is running.

8. The method of claim 1, further comprising:
when receiving respective incoming downloading requests from multiple requesting client devices, prioritizing acceptance for the multiple incoming downloading requests in accordance with a determination of whether a respective user of each requesting client device is grouped together with a user of the first client device in the game session.

9. A first client device, comprising:
one or more processors;
memory; and
one or more program modules stored in the memory and configured for execution by the one or more processors, the one or more program modules including instructions for:
while a game session related to the game software is running at the first client device:
receiving an updating notification received from a gaming server, the updating notification identifying updating data for the game software and specifying predefined criteria for locating one or more other client devices that possess the identified updating data;
locating at least one second client device in accordance with the predefined criteria;
sending an outgoing downloading request to the located at least one second client device;
upon acceptance of the outgoing downloading request by the at least one second client device, downloading the updating data from the located at least one second client device,
and dynamically adjusting respective bandwidth allocated to the downloading
upon downloading at least part of the updating data, registering with the gaming server as a device possessing the downloaded updating data;
receiving an incoming downloading request for the downloaded updating data from a third client device; and
upon receiving the incoming downloading request for the downloaded updating data from the third client device, uploading the downloaded updating data to the third client device.

10. The first client device of claim 9,
wherein the uploading further comprises: dynamically adjusting respective bandwidth allocated to the uploading in accordance with the data transmission need of the game session.

11. The first client device of claim 9, wherein the predefined criteria require that the first client device be in a common geographic region as the at least one second client device.

12. The first client device of claim 9, wherein the predefined criteria require that respective historic traffic density between the first client device and each of the at least one second client device is above a predetermined threshold.

13. The first client device of claim 9, wherein the updating data is categorized as either normal updating data or sensitive updating data.

14. The first client device of claim 13, the one or more program modules further include instructions for:
reporting to the gaming server upon downloading any sensitive updating data; and
deleting the sensitive updating data upon instruction by the gaming server.

15. The first client device of claim 9, the one or more program modules further include instructions for:
utilizing at least part of the updating data in the game software while the game session is running.

16. The first client device of claim 9, the one or more program modules further include instructions for:
when receiving respective incoming downloading requests from multiple requesting client devices, prioritizing acceptance for the multiple incoming downloading requests in accordance with a determination of whether a respective user of each requesting client device is grouped together with a user of the first client device in the game session.

17. A non-transitory computer readable storage medium having instructions stored thereon, the instructions, when executed by one or more processors, cause the processors to perform operations comprising:
while a game session related to the game software is running at the client device:
receive an updating notification received from a gaming server, the updating notification identifying updating data for the game software and specifying predefined criteria for locating one or more other client devices that possess the identified updating data;
locate at least one second client device in accordance with the predefined criteria;
send an outgoing downloading request to the located at least one second client device; and
upon acceptance of the outgoing downloading request by the at least one second client device, download the updating data from the located at least one second client device
and dynamically adjusting respective bandwidth allocated to the downloading;
upon downloading at least part of the updating data, register with the gaming server as a device possessing the downloaded updating data;
receive an incoming downloading request for the downloaded updating data from a third client device; and
upon receiving the incoming downloading request for the downloaded updating data from the third client device, upload the downloaded updating data to the third client device.

18. The computer-readable medium of claim 17,
wherein the uploading further comprises: dynamically adjusting respective bandwidth allocated to the uploading in accordance with the data transmission need of the game session.

19. The computer readable medium of claim 17, wherein the updating data is categorized as either normal updating data or sensitive updating data, and wherein the operations further comprise:
reporting to the gaming server upon downloading any sensitive updating data; and
deleting the sensitive updating data upon instruction by the gaming server.

20. The computer-readable medium of claim 17, wherein the operations further comprise:
when receiving respective incoming downloading requests from multiple requesting client devices, prioritizing acceptance for the multiple incoming downloading requests in accordance with a determination of whether a respective user of each requesting client device is grouped together with a user of the first client device in the game session.

* * * * *